UNITED STATES PATENT OFFICE.

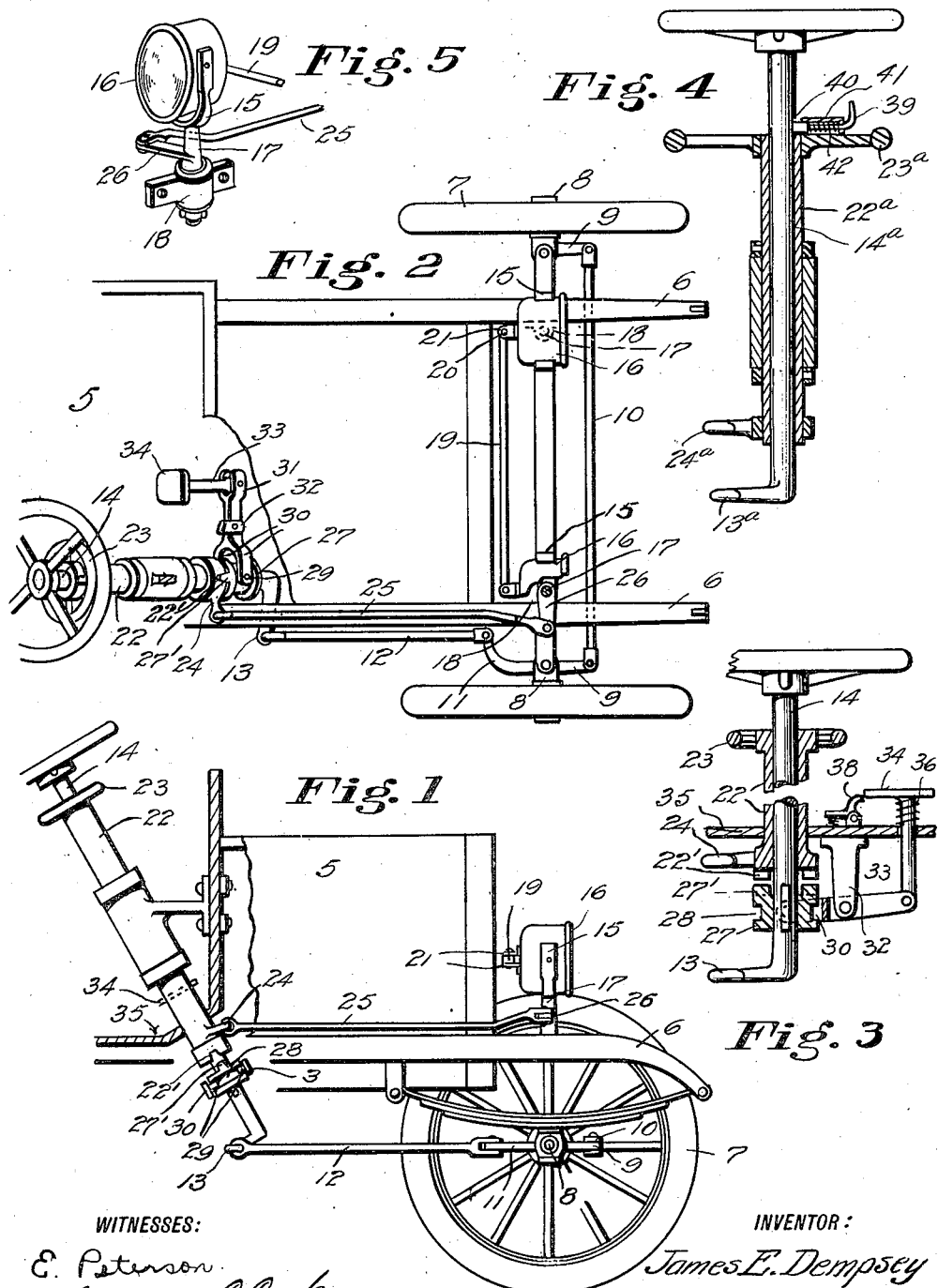

JAMES E. DEMPSEY, OF SEATTLE, WASHINGTON.

HEADLIGHT CONTROL FOR AUTOMOBILES.

1,138,358.                    Specification of Letters Patent.        Patented May 4, 1915.

Application filed February 16, 1914. Serial No. 818,873.

*To all whom it may concern:*

Be it known that I, JAMES E. DEMPSEY, a citizen of the United States, residing at Seattle, in the county of King and State of Washington, have invented certain new and useful Improvements in Headlight Control for Automobiles, of which the following is a specification.

This invention relates to controllers for the headlights of automobiles.

The object of the invention is the provision of manually controlled devices whereby the headlights or lamps of an automobile may be turned in unison with or independently of the leading or front wheels of the vehicle to project the lights from the lamps either in the path over which the automobile is to travel or to either side of the same.

The invention consists in the novel construction and adaptation of parts, as will be hereinafter described and claimed.

In the accompanying drawings, Figure 1 is a view partly in side elevation and partly in vertical section of the front end of an automobile with the near front wheel removed and with my invention applied. Fig. 2 is a plan view of the same with a portion of the automobile body broken away. Fig. 3 is a transverse vertical sectional view of the steering devices and the associated parts, such as illustrated in Figs. 1 and 2, for regulating the turning of the headlights. Fig. 4 is a view similar to Fig. 3 of a modification of the light-regulating appliances. Fig. 5 is a perspective view of one of the headlights and the connections therefor.

In the drawings, the reference numeral 5 designates the body of an automobile and 6 the side bars for the under-frame therefor. The front wheels 7 are journaled upon the usual stub axles 8 which are provided with arms 9 for connection with a connecting rod 10 so that both wheels are directed in unison. One of said stub shafts is provided with a second arm 11 which is connected by a rod 12 with a crank-arm 13 provided on the lower end of the steering post 14.

All of the above named parts are or may be of the usual construction.

According to the present invention, the harps or yokes 15 which carry the lamps 16 are provided with shanks 17 which are rotatably supported in journal boxes 18 secured to the respective side bars 6.

A transversely arranged rod 19 is connected by pins 20 with lugs 21 provided on the lamps whereby rotary motion imparted to one of said lamps will transmit corresponding motion to the other one.

The preferred form of the lamp-controlling devices is shown in Figs. 1, 2 and 3 and consists of a sleeve 22 mounted for rotary movements on the steering post 14 and is provided at its upper end with a hand wheel 23. Adjacent its lower end, said sleeve is provided with a crank-arm 24 which is connected by a connecting rod 25 with a crank-arm 26 provided upon one of the lamps 16. By such devices, it is apparent that by turning the sleeve 22 through the instrumentality of the hand-wheel 23 the lamps 16 may be turned to direct the light rays thereof in selected directions.

The invention also includes means for coupling the above described lamp connections to the automobile steering devices and which I will now explain. A collar 27 is splined to the steering post below said sleeve, and the opposing faces of the sleeve and collar are provided with inter-engaging devices, such as notches $22^1$ and teeth $27^1$ which serve as clutch elements. The collar 27 is provided with a peripheral groove 28 to receive studs 29 provided on the branches 30 formed on the end of a lever 31. The lever is fulcrumed intermediate its length to a support 32 which is rigidly secured to the car-body 5 and, at the end remote from its connection with said collar, the lever is connected with the shank 33 of a tread-plate 34, which is disposed above the car-floor 35 to be within convenient reach of the driver's foot.

36 (Fig. 3) represents a spring tending to elevate the tread-plate 34 and thus cause the lever 31 to yieldingly hold the collar or clutch element 27 out of engagement with the sleeve 22, a condition in which the lights will be regulated independently of the steering devices. To engage the clutch element 27 with the sleeve 22 for manipulating the lights by means of the steering wheel the operator depresses the tread-plate 34 with his foot to accordingly affect said element, whereupon a spring-actuated latch 38 (shown only in Fig. 3) engages the tread plate to maintain the latter in its depressed position. To disengage the lamp-controlling devices from the steering post, the operator first disengages with his foot the latch 38 from the tread-plate, whereupon the spring 36 asserts itself to cause the withdrawal of the clutch element 27 from the sleeve 22.

In the modification shown in Fig. 4 the sleeve 22ª, like that shown in the other views, is mounted for rotation on the steering post 14ª, but instead of having treadle-operated devices for coupling the sleeve to the post, I here employ a latch-bolt 39 on the hand-wheel 23ª of the sleeve to engage in a slot 40 provided in the post. The bolt 39 is housed in a casing 41 and a spring 42 is utilized to normally retain the bolt in engagement within the post slot.

As in the aforedescribed embodiment, the sleeve 22ª and post 14ª are respectively provided with crank-arms 24ª and 13ª for the connection, to which are attached rods having corresponding functions to those indicated by 25 and 12 in Figs. 1 and 2.

To operate the appliances shown in Fig. 4, latch-bolt 39 is engaged to or disengaged from the steering post according to whether the lamps are to be moved positively with the steering devices or independently of the same. The lamps, however, would desirably be connected to operate in unison with the steering devices, and the independent control for the lamps used to traverse with light ahead of the vehicle to ascertain the best portions of a road for travel, to avoid an obstacle, or to direct the light-rays to a distance ahead on a curved track.

The coupling or disengagement of the independent and steering control is conveniently and rapidly attained and the value of the invention, it is believed, will be appreciated by automobile users.

Having described my invention, what I claim, is—

1. A device for controlling headlights, comprising a steering post, a clutch member splined thereon and capable of reciprocatory movements with relation thereto, a sleeve mounted thereon for rotary movements and means whereby said sleeve and clutch member may be rotated in unison or independently of one another.

2. In combination with the steering post of an automobile; of a sleeve mounted thereon, said sleeve being provided at one end with a hand wheel and at its other end with a plurality of recesses, a clutch member splined on said steering post and provided with a plurality of teeth, and means controlled by the operator for bringing said teeth into engagement with said recesses, whereby said sleeve and said clutch member may be rotated in unison with said steering post.

3. In a device of the class described, a steering post, a sleeve loosely mounted thereon, a clutch member splined thereon, means for rotating said sleeve independently of said steering post, and spring actuated means for reciprocating said clutch member, whereby said sleeve and said clutch member are made to rotate in unison.

4. In a device of the class described, the combination with a steering post and headlights, of a sleeve loosely mounted thereon, provided with a hand wheel at one end thereof and a plurality of recesses at the other end thereof, a clutch member splined on said steering post adjacent the recessed end of said sleeve, means connecting said sleeve with said headlights for rotating the latter in unison with or independently of said steering post.

5. A control for headlights comprising a steering post having a sleeve loosely mounted thereon, and a clutch member splined thereon, a spring actuated tread plate adapted to reciprocate said clutch member into and out of engagement with said loosely mounted sleeve, and means coöperating with said tread plate for locking said clutch member into engagement with said loosely mounted sleeve thereby affording means whereby said clutch member and said sleeve are made to operate in unison with said steering post.

6. A control for headlights comprising a steering post, a sleeve loosely mounted thereon, means positioned on the dash-board of a vehicle adapted to support said sleeve in proper relation to said steering post, and spring actuated means for locking said loosely mounted sleeve for rotary movements in unison with said steering post.

7. In a device of the class described, a steering post, a sleeve and a clutch member mounted thereon and spaced apart, means for rotating said sleeve independently of said steering post, and means for reciprocating said clutch member, whereby said sleeve and said clutch member may be rotated in unison with said steering post.

Signed at Seattle, Wash., this 3d day of February, 1914.

JAMES E. DEMPSEY.

Witnesses:
 PIERRE BARNES,
 CECIL GODBEN.